UNITED STATES PATENT OFFICE.

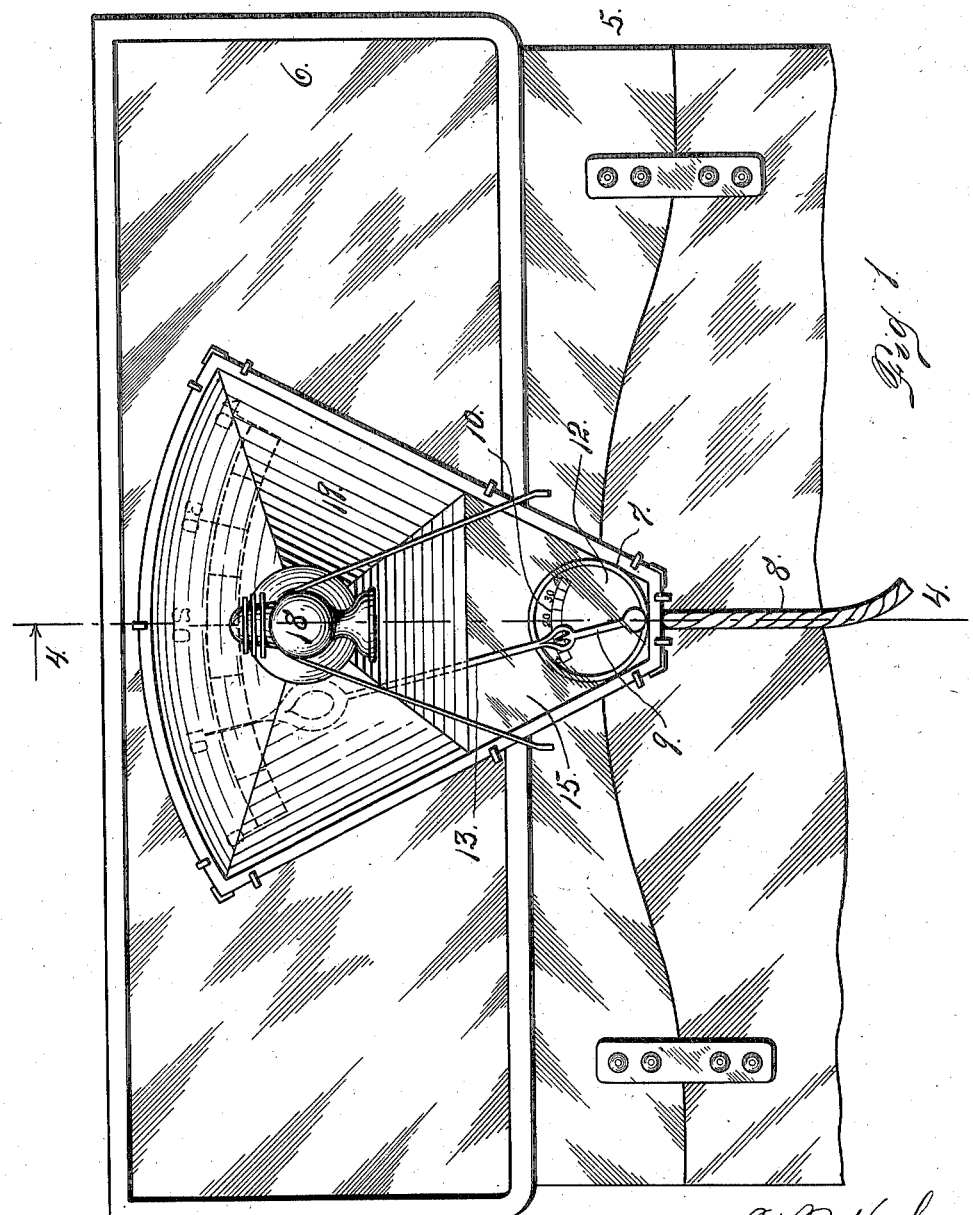

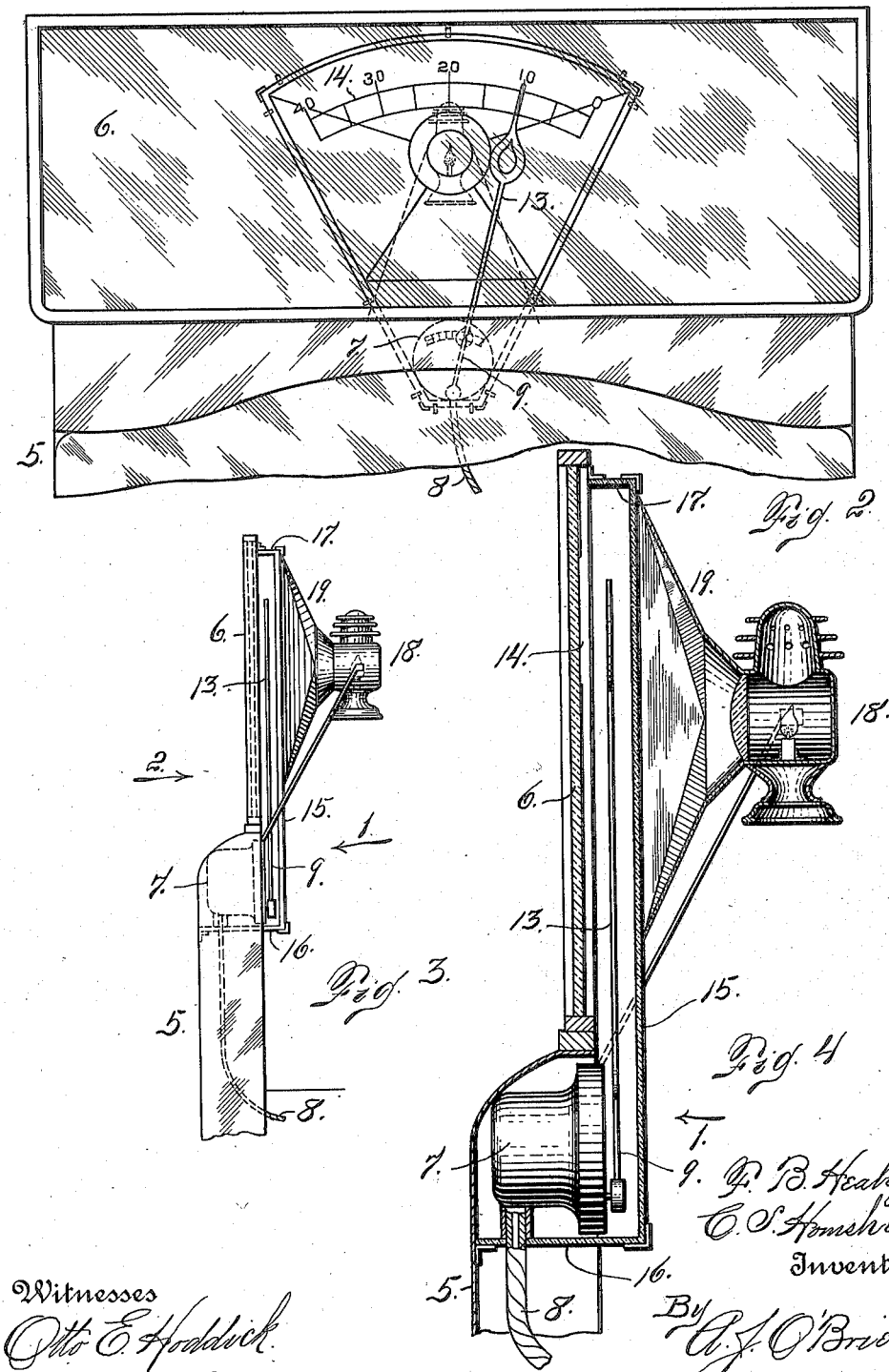

FRED B. HEALEY AND CARL S. HOMSHER, OF DENVER, COLORADO.

SPEEDOMETER.

957,773.

Specification of Letters Patent. Patented May 10, 1910.

Application filed May 28, 1909. Serial No. 498,885.

*To all whom it may concern:*

Be it known that we, FRED B. HEALEY and CARL S. HOMSHER, citizens of the United States, residing in the city and county of Denver and State of Colorado, have invented certain new and useful Improvements in Speedometers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in speedometers, our object being to provide an attachment or construction adapted for use in connection with an ordinary speedometer, whereby the rate of speed at which an automobile or other vehicle is traveling may be readily observed by officers and others whose business it is to regulate the speed of vehicles in cities or other localities. Heretofore, as far as we are aware, no provision has been made for the accomplishment of the foregoing object, with the result that an officer or person endeavoring to regulate the speed of these vehicles has no positive proof from the machine itself as to its speed, and the result is that disputes are continually arising between the officers and those in charge of these vehicles.

In our improved construction, we simply extend the hand or pointer of an ordinary speedometer and form a relatively large dial, over which the hand extension is caused to travel, the said dial being provided with characters harmonizing with those of the small dial of the speedometer, but on a larger scale, whereby these characters may be readily observed at a distance. The construction is such that this dial is observable through a transparent plate, constituting or forming a part of the dashboard or wind shield of the vehicle. It is preferred that the surface of the plate, except the graduated portion thereof, containing the speed indicating characters, shall be frosted in order that the figures on the transparent portion shall be more conspicuous. In the rear of the extension pointer is also located a transparent plate, whereby the pointer is completely incased. In the rear of the last named plate is mounted a lamp or lantern for use at night, a reflector being employed in connection therewith whereby a strong light is thrown upon the dial containing the aforesaid characters.

Having briefly outlined our improved construction, we will proceed to describe the same in detail, reference being made to the accompanying drawing, in which is illustrated the embodiment thereof.

In this drawing: Figure 1 is a rear elevation of the dashboard of a vehicle, equipped with our improved speedometer construction. Fig. 2 is a front view of the same, or a view looking in the direction opposite the view in Fig. 1, but shown on a smaller scale. This is also the view, looking in the direction of arrow 2, Fig. 3. Fig. 3 is a side elevation of the same. Fig. 4 is a vertical section taken on the line 4—4 Fig. 1.

The same reference characters indicate the same parts in all the views.

Let the numeral 5 designate the front part or dashboard of an automobile, or similar vehicle, upon which is mounted a wind shield 6, composed of glass or other suitable transparent material. Mounted upon the dashboard in the usual manner is a speedometer 7, operated from a flexible shaft 8, connected with a suitable part of the vehicle in the usual manner. As nothing is claimed upon the construction of the mechanism of the speedometer, such mechanism will not be described in detail in this application.

The pointer 9 of a speedometer, when of ordinary construction, rises to a graduated portion 10 on the small dial 12. This pointer in our improved construction is extended, as shown at 13 and projects upwardly in the rear of the wind sheld 6, terminating in front of a graduated segment 14, which is provided with numerals from 0 to 40 to indicate the speed at which the machine is traveling, and corresponding with the speed indicated on the dial of the speedometer. By extending this hand and making it relatively long, it is adapted to travel a relatively long distance, while the pointer 9 is traveling over the short distance covered by the graduated part 10 of this dial.

In the rear of the extension pointer 13 is located a transparent plate 15, which is connected at the bottom by a supporting plate 16, which extends to the dashboard 5 and is suitably connected therewith. The top of the plate 15 is connected with the wind shield 6 by a short top plate 17.

The wind shield 6, together with the plate 15, and the upper part of the dash board constitute a casing for the speedometer and the extension pointer of our improved device.

In the rear of the transparent plate 15, is located a lamp or lantern 18, which is connected with a reflector 19, also located in the rear of the plate 15, and adapted to throw a light advantageously upon the wind shield 6, and particularly the part 14 thereof, containing the graduations and characters indicating the speed of travel. This lamp and reflector are of course for use only in the night or under circumstances where artificial light is required in order that the extension pointer and enlarged reference characters may be readily observed at a distance.

From the foregoing description, it will be understood that while the dial of an ordinary speedometer is only observable from a position in front of the dashboard, or by the person occupying the machine, the reference characters and the upper extremity of the extension pointer of our improved construction are observable by a person occupying a position in front of the machine and at a considerable distance therefrom, since the length of the pointer, the area of the space 14 and the size of the speed-indicating reference characters may be made as large as may be necessary in order to accomplish the desired result.

It must be understood that our improved construction is adapted for use in connection with self-propelled vehicles of all kinds, street cars, motor-cycles and other velocipedes.

Having thus described our invention, what we claim is:

1. The combination with the dashboard and wind shield of a vehicle, of a speedometer carried by said dashboard, a plate having a transparent portion extending above the speedometer, the said plate being provided with speed-indicating characters to harmonize with similar characters upon the dial of the speedometer but formed on a larger scale, a pointer mounted on the speedometer, an extension pointer carried by the pointer mounted on the speedometer, the said extension pointer reaching to the graduated part of the transparent plate and adapted to travel in the rear of the same, substantially as described.

2. The combination with a speedometer, of a plate extending above the speedometer and having formed thereon a duplicate on a larger scale of the speed-indicating characters formed on the dial of the speedometer, a pointer mounted on the speedometer for indicating the characters thereon, an extension pointer integral with said speedometer pointer and describing a circular arc around the pivoted extremity of the speedometer pointer, as a center, the said extension pointer reaching to the speed-indicating characters formed on the plate, the said plate having a transparent portion upon which the speed-indicating characters are formed, and the said plate being positioned in front of the extension pointer, substantially as described.

In testimony whereof we affix our signatures in presence of two witnesses.

FRED B. HEALEY.
CARL S. HOMSHER.

Witnesses:
A. J. O'Brien,
Jessie F. Hobart.